United States Patent [19]

Abe et al.

[11] 4,065,157
[45] Dec. 27, 1977

[54] KNEE PROTECTOR

[75] Inventors: Fumiyuki Abe; Kazuo Ikawa, both of Yokohama; Mituo Ehama, Yokosuka; Naoki Ogawa, Yokohama, all of Japan

[73] Assignee: Nissan Motor Co., Ltd., Yokohama, Japan

[21] Appl. No.: 691,942

[22] Filed: June 1, 1976

[30] Foreign Application Priority Data

June 6, 1975 Japan .................. 50-76644[U]

[51] Int. Cl.² .................................. B60R 21/04
[52] U.S. Cl. .......................... 280/751; 188/1 C
[58] Field of Search ............ 280/748, 750, 751, 752; 180/90; 188/1 C

[56] References Cited

U.S. PATENT DOCUMENTS

| 2,332,357 | 10/1943 | Uffelman | 280/752 X |
|---|---|---|---|
| 3,448,821 | 6/1969 | McGuire | 180/90 |
| 3,590,136 | 6/1971 | Kunishi | 180/90 X |
| 3,834,482 | 9/1974 | Wada et al. | 280/752 X |
| 3,876,228 | 4/1975 | Hawkins et al. | 280/752 |

FOREIGN PATENT DOCUMENTS 1,316,722   5/1973   United Kingdom ............. 280/752

Primary Examiner—Joseph F. Peters, Jr.
Assistant Examiner—Michael J. Forman
Attorney, Agent, or Firm—Frank J. Jordan

[57] ABSTRACT

A panel extends between and is anchored to the side walls of a vehicle occupant space to form a surface substantially juxtaposed to the knees of seated occupants. Four box-profiled crushable elements are laterally arranged and mounted on and along the elongate panel.

6 Claims, 4 Drawing Figures

KNEE PROTECTOR

This invention relates generally to a vehicle occupant protecting safety device and in particular to an improved crushable knee protector for protecting knees and legs of the occupant during a collision of the vehicle.

Conventionally, knee protectors consisting of variously shaped panels and the like are separately mounted in front of laterally arranged vehicle seats, one for each seat. Thus, each said knee protector is mounted at one end to either side wall of an occupant compartment of the vehicle body and at the other to a central portion of the vehicle body such as a center tunnel or a center portion of an instrument panel. When fastening the knee protector for instance to the center tunnel, only a limited mounting area is available and accordingly a mounting member such as a bracket should provide enough stiffness to maintain the required mounting stability.

This however entails that the knee protector is subject to less deformation at the center mounting area than at the side wall mounting area. Consequently, the impact energy absorbing effect resulting from crush of the knee protector is uneven and is insufficient at a part of the knee protector adjacent the central area of the vehicle body, resulting in a more severe injury of a knee and leg of the vehicle occupant on this side.

The knee protector of this invention obviates such defects by providing an elongate panel which extends substantially throughout the lateral length of the occupant compartment of the vehicle body. The panel is at the both ends anchored to the adjacent side walls of the occupant compartment and has a surface substantially juxtaposed to the knees of the occupant. A plurality of box-profiled crushable elements are mounted on and along the panel which are collapsed by the pressure of the occupant's knees to absorb and attenuate the impact energy during collision of the vehicle.

A primary object of this invention is to provide an improved crushable knee protector extending throughout the lateral length of the vehicle body occupant space without any large mounting area at the central portion of the vehicle body being required. Another object of this invention is to provide an improved crushable knee protector which comprises a lateral elongate panel mounted at both ends to the respective side walls of the occupant space and having a surface substantially juxtaposed to the knees of the occupant and a plurality of box-profiled crushable elements mounted on and along the panel.

These and other objects and features of the invention will be readily apparent from the following specification and drawings wherein.

Figure 1:
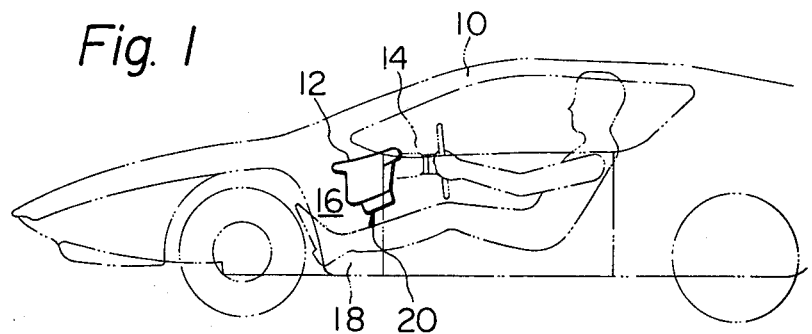
FIG. 1 is a schematic section view of a vehicle body equipped with a knee protector unit according to this invention.

Referring to the Figures, a vehicle body 10 is as usual installed with an instrument panel 12 and a steering assembly 14 in or adjacent a foot space 16 of the vehicle body interior. The vehicle occupant is shown to be seated in a normal posture. The knee protector unit generally indicated by numeral 20 according to the invention is mounted for instance on the underside of the instrument panel 12, although it may be secured to any other suitable part of the vehicle body such as the back of a front seat to protect the knees of rear seat occupants.

Figure 2:
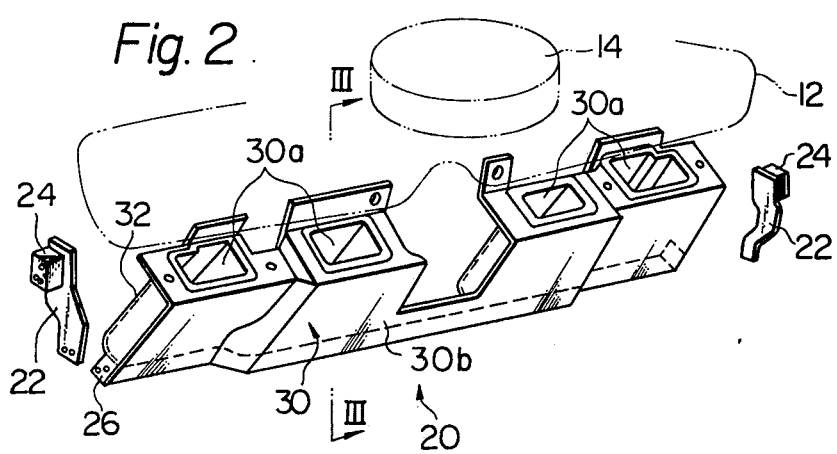
FIG. 2 is a perspective view of a preferred embodiment of knee protector unit according to this invention.

The detailed construction of the knee protector unit 20 is best seen in FIG. 2, which exemplarily shows the unit particularly for a driver's seat. As shown, a pair of mounting elements or brackets 22 are fixed through resilient members 24 to the adjacent side walls of the foot space 16, for instance, the dash side panels 18 (FIG. 1). The brackets 22 may preferably be fastened to the side panels together with vehicle body door hinges (not shown) with a view to saving the mounting space required and providing good appearance. An elongate, upwardly opened channel-shaped cross beam 26 is transversely extended between the two brackets 22 and is anchored to the same at its both ends. The cross beam 26 may be differently shaped, for instance, of a semicylindrical cross-section.

Secured to the bottom face of the cross beam 26 is a permanently deformable, lateral elongate panel 30 which also transversely extends along the cross beam 26 throughout the length thereof. The panel 30 essentially consists of a bottom surface 30b, the front peripheral edge of which is secured to the bottom face of the cross beam 26 as previously mentioned, and an upright surface 30c extending substantially upright from the rear edge of the surface 30b toward the instrument panel 12. The upper edge of the upright surface 30c is bolted or welded to the underside of the instrument panel 12 and the steering assembly 14.

The upright surface 30c of the panel 30 defines a plurality of openings 30a facing the chest of the occupant, preferably four, two of which are adjacent the central area of the knee protector unit and located substantially above the respective knees of the ordinarilly postured seated occupant.

Figure 3:
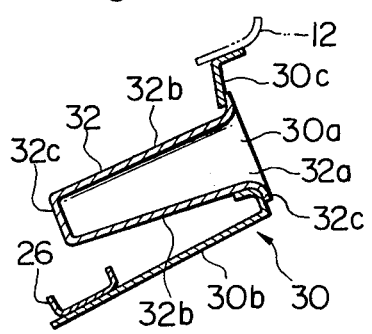
FIG. 3 is a section view taken along line III—III of FIG. 2.

A plurality of box-profiled crushable elements 32 (FIG. 3), the number of which preferably corresponds to that of the openings 30a of the panel, each has an opening 32a alinged with the corresponding one of the openings 30a. The peripheral edge of the opening 32a is laid over and bonded to the peripheral edge of the aligned opening 30a of the panel. The opening 32a of the box-profiled element however may be provided in a base wall 32b thereof facing the cross beam 26, or in a side wall 32c or if desired, two aligned openings 32a may be defined at the both side walls 32c. The box-profiled elements 32 are made of any suitable material such as thin sheet metal, plastic or paper sheet.

In most passenger cars and vehicles with two or more seats arranged laterally of the vehicle body, the cross beam and the elongate panel should be extended to the required length to match the lateral length of the enlarged occupant space and one or more sets of box-profiled elements be additionally mounted on the elongate panel, providing a unitary knee protector assembly for two or more seat occupants.

In an alternative arrangement (not shown), the elongate panel 30 may be directly fastened to the vehicle body side panels thus dispensing with the cross beam 26. The brackets 22 are also dispensable so that the cross beam 26 may be directly anchored to the body side panels.

Figure 4:
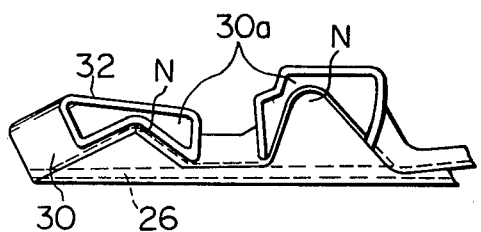
FIG. 4 is a schematic section view showing a deformed or crushed condition of a knee protector unit according to this invention.

The operation characteristics of the preferred embodiment of this invention is briefly described below. Upon collision of the vehicle, the cross beam 26 and the brackets 22 will bend while the panel 30 and the box-profiled elements 32 will collapse to a considerable extent. FIG. 4 particularly illustrates the deformation characteristics of the two box-profiled elements 32 adjacent and on the both sides of the central area of the knee protector unit 20. As shown, the knees of the occupant are advantageously restrained and protected respectively at the portions N, if the center lines of the respective knees are properly aligned with the center lines of the box-shaped elements. It would be readily understood that no part of the knee protector unit adjacent the vehicle body central area is prevented from deformation by any stiff mounting element and large mounting area. Also, since the box-profiled elements 32 are located between the instrument panel 12 and the crushable panel 30, the knees of the occupant are restrained by the crushed box-profiled elements promptly after the collision, obviating an excessive pressure being applied to the knees and legs. Besides, the impact energy applied to the knee protector is born individually by the cross beam, box-profiled elements, brackets and crushable panels to be efficiently dissipated by the limited area of the knee protector.

To further enhance the energy absorbing effect, another collapsible element such as a tubular panel or the like may be mounted on the box-shaped elements.

The box-profiled elements 32 with the openings 32a facing the occupant may be utilized as a storage space, if desired. This is particularly advantageous in such a vehicle which is lacking in storage space adjacent the instrument panel since a glove box at the instrument panel is used for storing an inflatable air cushion or the like. To maintain enough collapsibility of the knee protector, it is of course undesirable to fill the box-profiled elements with many and bulky articles.

What is claimed is:

1. A knee protector for protecting knees and legs of a vehicle seat occupant upon collision of the vehicle comprising:

a lateral elongated bottom panel extending between and anchored to both side walls of an occupant space defined by the body of the vehicle, substantially in juxtaposition to the knees of the seated occupant, said bottom panel having a rear end disposed rearwardly relative to the vehicle body, an upright panel extending substantially upright from the rear end of the bottom panel and having a plurality of laterally spaced openings facing the chest of the seated occupant, and a plurality of box-shaped crushable elements mounted in the openings in the upright panel, each of said elements extending forwardly of the vehicle body from the upright panel, each of said elements having a generally cenral axis in a vertical plane parallel to the longitudinal axis of the vehicle and substantially parallel to the bottom panel, each of said elements having an opening in alignment with the corresponding one of said openings in the upright panel, said elements being collapsible by the knees of the occupant upon collision of the vehicle.

2. A knee protector as defined in claim 1 wherein said box-shaped crushable elements are hollow.

3. A knee protector as defined in claim 1 wherein said box-shaped crushable elements comprise a pluraliy of side walls joined to a bottom wall.

4. A knee protector as defined in claim 1 wherein each of said elements has a peripheral edge portion defining the opening in the element, each of said openings in said upright panel being surrounded by a peripheral edge portion on the upright panel, said peripheral edge portions of said elements being disposed in abutting relationship with the peripheral edge portions surrounding the openings in said upright panel, and means joining said abutting peripheral edge portions.

5. A knee protector for protecting knees and legs of a vehicle seat occupant upon collision of the vehicle comprising:

two mounting elements fastened respectively to the side walls of an occupant space defined by the body of the vehicle, a cross beam extending between and anchored at both its longitudinal ends to said mounting elements, a lateral elongated bottom panel mounted on said cross beam substantially in juxtaposition to the knees of the seated occupant, said bottom panel having a rear end disposed rearwardly relative to the vehicle body, an upright panel extending substantially upright from the rear end of the bottom panel and having a plurality of laterally spaced openings facing the chest of the seated occupant, and a plurality of box-shaped crushable elements mounted in the upright panel, each of said elements extending forwardly of the vehicle body from the upright panel, each of said elements having a generally central axis in a vertical plane parallel to the longitudinal axis of the vehicle and substantially parallel to the bottom panel, each of said elements having an opening in alignment with the corresponding one of said openings in the upright panel, at least two of said crushable elements being located substantially above the respective knees of the seated occupant, said elements being collapsible by the knees of the occupant upon collision of the vehicle.

6. A knee protector as defined in claim 5, further comprising a resilient member interposed between each of said mounting elements and the corresponding side wall.

* * * * *